US012674357B2

(12) United States Patent
Lopez

(10) Patent No.: US 12,674,357 B2
(45) Date of Patent: Jul. 7, 2026

(54) LADDER, COMPONENTS THEREOF, AND ACCESSORIES FOR USE THEREWITH

(71) Applicant: Werner Co., Greenville, PA (US)

(72) Inventor: Ivan D. Lopez, Hermitage, PA (US)

(73) Assignee: Werner Co., Itasca, IL (US)

( * ) Notice: Subject to any disclaimer, the term of this patent is extended or adjusted under 35 U.S.C. 154(b) by 664 days.

(21) Appl. No.: 18/102,537

(22) Filed: Jan. 27, 2023

(65) Prior Publication Data

US 2023/0167683 A1 Jun. 1, 2023

Related U.S. Application Data

(63) Continuation-in-part of application No. 17/497,759, filed on Oct. 8, 2021.

(60) Provisional application No. 63/304,369, filed on Jan. 28, 2022, provisional application No. 63/091,742, filed on Oct. 14, 2020.

(51) Int. Cl.
*E06C 7/00* (2006.01)
*E06C 1/04* (2006.01)
*E06C 7/18* (2006.01)

(52) U.S. Cl.
CPC ................ *E06C 7/006* (2013.01); *E06C 1/04* (2013.01); *E06C 7/182* (2013.01)

(58) Field of Classification Search
CPC . E06C 7/006; E06C 1/04; E06C 7/182; E04G 5/141; E04G 5/00
See application file for complete search history.

(56) References Cited

U.S. PATENT DOCUMENTS 48,647 A * 7/1865 Boley ................. F04D 29/4226 415/204
2,140,828 A * 12/1938 Carle ........................ E06C 1/36 248/214
2,881,028 A * 4/1959 Baird ........................ E06C 7/16 182/120
2,883,134 A * 4/1959 Patrick, V ................. E06C 7/14 248/210

(Continued)

FOREIGN PATENT DOCUMENTS

AU 2019101362 A4 * 12/2019 ............... E06C 9/10
CA 3134142 12/2023

(Continued)

OTHER PUBLICATIONS

CN 206376736 translation (Year: 2025).*

(Continued)

*Primary Examiner* — Brian D Mattei
*Assistant Examiner* — Kathleen M. McFarland
(74) *Attorney, Agent, or Firm* — Fitch, Even, Tabin & Flannery LLP

(57) ABSTRACT

A gate assembly may include a gate which includes a first end and a second end, one or more hinges coupled to the first end of the gate, wherein at least one of the one or more hinges includes an offset spring assisted hinge including a hinge rivet, a spring, a plunger, a hinge bolt, and a support tube, a stop coupled to the second end of the gate and configured to contact a stop mounting bracket, and a mounting bracket attached to the one or more hinges, wherein the gate is rotatably coupled to the mounting bracket via the one or more hinges.

19 Claims, 11 Drawing Sheets

(56) References Cited

U.S. PATENT DOCUMENTS

| | | | | | |
|---|---|---|---|---|---|
| 3,828,889 | A * | 8/1974 | Rehm | E06C 1/36 | 182/206 |
| 4,502,566 | A | 3/1985 | Wing | | |
| 5,080,192 | A * | 1/1992 | Kerr | E06C 1/397 | 182/17 |
| 5,261,507 | A * | 11/1993 | Williams | E06C 7/48 | 182/229 |
| 5,638,916 | A * | 6/1997 | Schneider | E06C 1/34 | 182/116 |
| 5,743,356 | A * | 4/1998 | Mitchell | E06C 7/48 | 182/229 |
| 6,347,685 | B1 * | 2/2002 | Ellis | E06C 7/182 | 182/106 |
| 7,077,239 | B1 * | 7/2006 | Hayman | E04G 7/305 | 182/178.1 |
| 7,134,860 | B2 * | 11/2006 | Pierik | B29C 37/00 | 425/88 |
| 8,522,487 | B2 * | 9/2013 | Whiting | E06C 7/182 | 52/72 |
| 8,915,023 | B2 * | 12/2014 | Whiting | E06C 7/182 | 52/72 |
| 9,169,693 | B2 * | 10/2015 | Honeycutt | E06C 1/397 | |
| 9,663,989 | B2 * | 5/2017 | Moss | E06C 1/397 | |
| 9,745,777 | B2 * | 8/2017 | Whiting | E04D 13/0335 | |
| 10,100,576 | B1 * | 10/2018 | Dimovski | E04F 11/062 | |
| 10,138,679 | B2 * | 11/2018 | Russell | E06C 7/185 | |
| 10,676,966 | B2 * | 6/2020 | Whiting | E04D 13/0335 | |
| 10,745,968 | B2 * | 8/2020 | Moss | E06C 1/397 | |
| 10,883,310 | B2 * | 1/2021 | Johnson | E06C 7/48 | |
| 2002/0108811 | A1 * | 8/2002 | Ulmschneider | E06C 7/482 | 182/206 |
| 2003/0098201 | A1 * | 5/2003 | Ellis | E06C 7/183 | 182/106 |
| 2005/0023084 | A1 * | 2/2005 | Lazarus | E06C 7/482 | 182/214 |
| 2005/0189173 | A1 * | 9/2005 | Becker | E04G 5/141 | 182/113 |
| 2005/0220917 | A1 * | 10/2005 | Pierik | B29C 37/00 | 425/88 |
| 2008/0190692 | A1 * | 8/2008 | Feik | E06C 7/182 | 182/107 |
| 2010/0031573 | A1 * | 2/2010 | Whiting | E06C 7/006 | 49/31 |
| 2012/0097481 | A1 * | 4/2012 | Schienke | E06C 1/06 | 182/107 |
| 2013/0186710 | A1 * | 7/2013 | Moss | E06C 7/185 | 182/104 |
| 2013/0340353 | A1 * | 12/2013 | Whiting | E05F 15/622 | 52/19 |
| 2015/0135604 | A1 * | 5/2015 | Whiting | E02D 29/127 | 52/19 |
| 2016/0138338 | A1 * | 5/2016 | Olson | E06C 1/397 | 182/124 |
| 2016/0215563 | A1 * | 7/2016 | Ellis | E06C 1/04 | |
| 2017/0226803 | A1 * | 8/2017 | Russell | E06C 7/185 | |
| 2017/0321452 | A1 * | 11/2017 | Whiting | E05F 15/71 | |
| 2018/0258698 | A1 * | 9/2018 | Minock | E06C 7/482 | |
| 2019/0078385 | A1 * | 3/2019 | Moss | E06C 1/397 | |
| 2020/0248507 | A1 * | 8/2020 | Moss | E06C 7/182 | |
| 2022/0112768 | A1 * | 4/2022 | Lopez | E06C 5/02 | |
| 2023/0048647 | A1 * | 2/2023 | MacKarvich | E06C 7/486 | |
| 2023/0167683 | A1 * | 6/2023 | Lopez | E06C 1/04 | 182/77 |

FOREIGN PATENT DOCUMENTS

| | | | | | |
|---|---|---|---|---|---|
| CN | 206376736 | | | 8/2017 | |
| CN | 206376736 | U | * | 8/2017 | |
| CN | 113250599 | A | * | 8/2021 | E06C 7/181 |
| EP | 3015640 | A1 | * | 5/2016 | E06C 7/185 |
| EP | 3816391 | A1 | * | 5/2021 | E06C 7/185 |
| EP | 3940189 | A1 | * | 1/2022 | E06C 7/14 |
| EP | 4148203 | A1 | * | 3/2023 | E04G 1/22 |
| EP | 4467749 | A1 | * | 11/2024 | E04G 1/24 |
| FR | 3023571 | | | 1/2016 | |
| FR | 3023571 | A1 | * | 1/2016 | E05D 9/12 |
| FR | 3113695 | A1 | * | 3/2022 | E06C 7/185 |
| GB | 200227 | | | 7/1923 | |
| GB | 200227 | A | * | 7/1923 | E05F 1/1253 |
| GB | 2484706 | A | * | 9/2008 | E04G 5/00 |
| KR | 20120008002 | A | * | 1/2012 | B62B 9/12 |
| KR | 20120008002 | | | 11/2012 | |
| KR | 20200098033 | A | * | 8/2020 | E06C 7/182 |
| NL | 1011205 | C1 | * | 8/2000 | E04G 5/10 |
| WO | WO-2008110812 | A1 | * | 9/2008 | E04G 5/14 |

OTHER PUBLICATIONS

FR 3023571 translation (Year: 2025).*

CIPO: Application No. 3,134,142; Office Action dated Dec. 21, 2022, 5 pages.

CIPO: Application No. 3,134, 142; Notice of Allowance dated Oct. 23, 2023, 1 page.

Extended European Search Report issued in App. No. EP24154295, dated Jul. 1, 2024, 8 pages.

* cited by examiner

LADDER, COMPONENTS THEREOF, AND ACCESSORIES FOR USE THEREWITH

CROSS-REFERENCE TO RELATED APPLICATIONS

This application is a continuation-in-part of U.S. Non-provisional application Ser. No. 17/497,759 filed Oct. 8, 2021, which claims the benefit of priority of U.S. Provisional Application No. 63/091,742 filed Oct. 14, 2020, both of which are incorporated by reference herein. This application also claims the benefit of priority of U.S. Provisional Application No. 63/304,369, filed on Jan. 28, 2022, which is incorporated by reference herein.

TECHNICAL FIELD

The present disclosure relates to a gate assembly for a ladder accessory which attaches to rails of a ladder to assist a user when climbing onto a structure, such as a roof.

BACKGROUND

Ladders typically provide access to elevated locations and/or items therein, and may be used in a variety of locations. Depending on the location and/or typical operating conditions in those locations, one or more accessories may be utilized with the ladder to improve safety, usability, and/or ease of use. Indeed, in some of these locations, accessories may be attached to a location and/or ladder to assist or help the user by customizing the ladder for a particular task or location.

Previously, a user may have employed a variety of ladder accessories, such as, e.g., ropes, fences and/or guardrails, to help manage risks associated with use of the ladder. These accessories, however, may be impractical for installation or use in certain locations.

SUMMARY

The present disclosure relates to ladders and one or more ladder accessories for use therewith, such as ladder extension elements and/or a gate assembly for a ladder. The ladder accessories, such as extension element(s), elongate member (s), and/or gate assemblies described herein, are typically used to help users manage potential risks associates with use of the ladders. For example, when a user climbs a ladder, such as to access a roof, the accessory and/or gate assembly may be used with the ladder to assist with management of potential risks associated therewith, such as the risk of falls.

In this way, a standard ladder can be adapted for many different tasks and/or locations by simply attaching the one or more accessories (e.g., extension elements and/or gate assembly) to the ladder. Further, the one or more accessories may help conform to or accommodate features of the use location.

By some approaches, the ladder accessories described herein may be easily attached and manipulated such that a user may quickly and easily associate the ladder accessories with the ladder for use therewith. Further, such manipulation of the ladder is typically performed with little or no damage or stress on the ladder.

In one configuration, the ladder accessory, such as the gate assembly includes a first elongate member extending from a first rail of the ladder and a second elongate member extending from a second rail of the ladder. In some embodiments, the gate assembly includes a mounting bracket which is removably coupled to the first elongate member, one or more hinges coupled to the mounting bracket, a gate coupled to the hinges, a stop coupled to the gate, and a stop bracket coupled to the second elongate member. The one or more hinges typically allow the gate to rotate outwards about the one or more hinges.

BRIEF DESCRIPTION OF THE DRAWINGS

Disclosed herein are embodiments of assemblies and apparatuses pertaining to providing a gate assembly. This description includes drawings, wherein.

Figure 1:
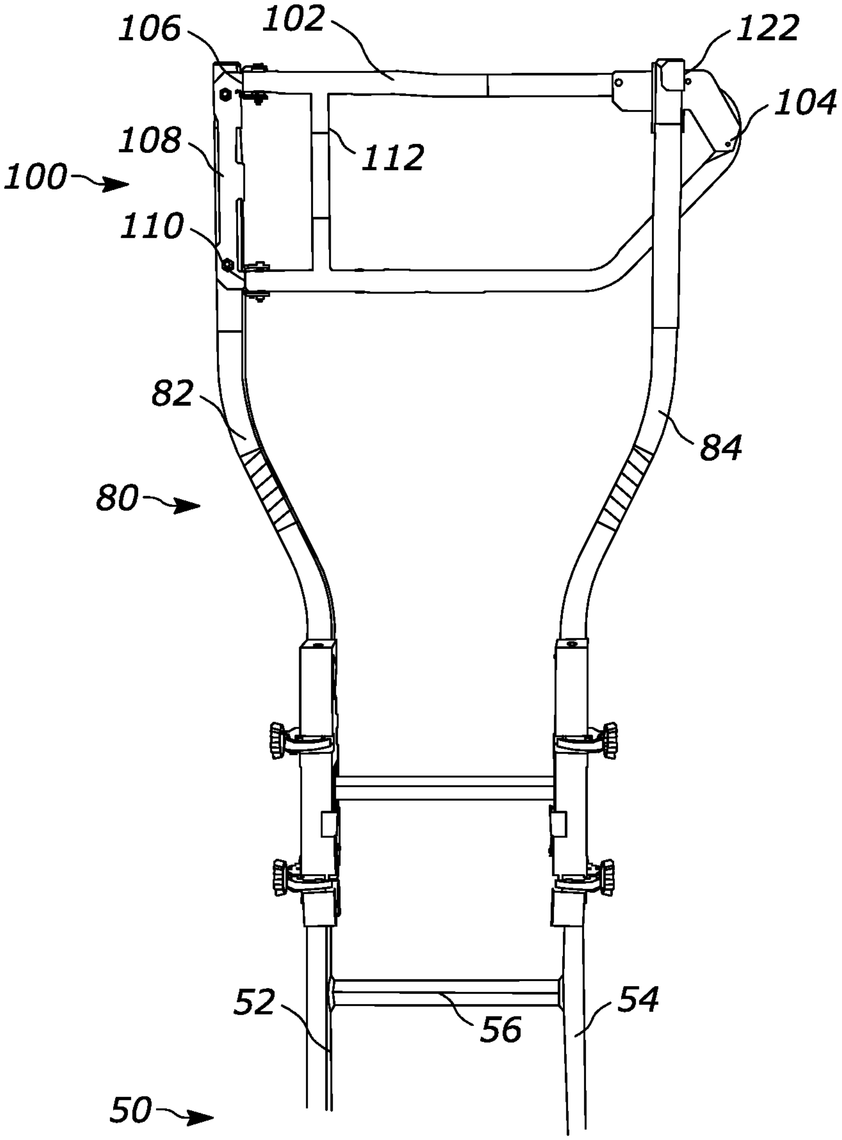
FIG. 1 is a front perspective view of a gate assembly coupled to a ladder accessory coupled to a ladder in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments and systems described herein which may be used to provide a gate assembly which may be coupled to a ladder or a ladder accessory such as extension or elongate arms or members. In one illustrative approach, a gate assembly for a ladder having a first elongate member extending from a first rail and a second elongate member extending from a second rail. The gate system or assembly may include an interface or mounting bracket which attaches to the first elongate member.

In some embodiments, the gate assembly includes a first gate bracket, or top hinge, attached to and inner face of the mounting bracket. When installed, the gate assembly typically includes a gate, such as a gate frame or body, pivotably attached to the top hinge so the gate can rotate outwards about the top hinge away from the climbing surface and towards the roof. The gate assembly may further include a stop bracket attached to the second elongate member, where the stop bracket contacts the gate which extend past the second elongate member such that the stop bracket acts as a stop to prevent the gate from rotating inwards and into the user's climbing path.

The present disclosure relates to a ladder that includes a first rail and a second rail in parallel and spaced relation with the first rail. The ladder also includes rungs attached to the first rail and the second rail. In some configurations, the ladder has a first accessory having a first elongate member coupled thereto. When installed, the first accessory may be attached to a top of the first rail. The ladder also may have a second accessory with a second elongate member coupled thereto. Similar to the first accessory, the second accessory may be attached to a top of the second rail. In some illustrative embodiments, the ladder includes a third accessory such as a gate assembly, which includes a gate that is pivotally attached to the first accessory. After installation, the gate may extend between the first accessory and the second accessory so it contacts the second accessory. While the third accessory of gate assembly is illustrated as coupled to other ladder accessories, i.e., the extension or elongate members, in other configurations the gate assembly may be directly coupled or secured to a ladder.

As shown in FIG. 1, the elongate members are attached to the rails of the ladder. The gate assembly has a mounting bracket having a general C-shaped cross-section that is riveted or bolted or fastened to one of the elongate members. On the inside face of the mounting bracket are one or more hinges, which may be welded to the mounting bracket. The mounting bracket also may include a strengthening member or part of the mounting bracket, such as on the inside face of the mounting bracket positioned between the hinges, which may thereby provide support for the mounting bracket and/or prevent bending. If desired, the entire inside face of the mounting bracket can be solid and one continuous piece having a C-shaped cross-section. In some exemplary embodiments, the mounting bracket and the hinges are comprised of a metal, such as aluminum or steel.

By some approaches, the top of the gate frame or body engages with and may fit into the top hinge, such that it may be rotatably attached to the first gate bracket. Similar, in some approaches, the bottom of the gate engages with and may fit into the second gate bracket and is rotatably attached to the second gate bracket. The gate may be of any shape which extends between the elongate members. In one illustrative embodiment, the gate frame or body is typically made of metal tubing. In one illustrative approach, the gate frame has a somewhat elongate configuration, such as an elongate D-shape. The tubing also may be formed such that the elongate tubing has a top end thereof coupled with or rotatably attaching the first gate bracket and the bottom end of the tubing coupled with or rotatably attaching the second gate bracket. In addition, there may be a vertical tube extending between the top of the tube and the bottom of the tube to provide support to the gate.

On the elongate member extending from the other rail on the opposite side of the ladder having the interface bracket, the gate system or assembly may include a locking bracket coupled to the associated elongate member. For example, the locking bracket may be configured to fit over and onto the top of the other elongate member. By one approach, the locking bracket is bolted or riveted to the other elongate member. In one example configuration, the rear face of the locking bracket may include a securement mechanism, such as, e.g. a magnet, or other type of holder, such as a strap or Velcro. In use, this securement mechanism may hold the other end of the gate to the locking bracket, so the gate stays in place. In some configurations, on the other end of the gate (that corresponds to the locking bracket) is a plate attached to the inside of the gate, which is positioned to contact the magnet on the locking bracket and increase the attraction of the gate to the magnet.

In one example implementation, when a user climbs onto a roof which has been reached with a ladder having extension or elongate members coupled thereto, such as a first accessory and a second accessory described above, as the user steps onto the roof from the ladder, the user may grab one of the elongate members with one hand such that the other hand is free to manipulate and push the gate open. In other approaches, a user may grasp the elongate members with their hands and use another body portions, e.g., their torso, or items associated therewith, to push or lean on the gate to thereby open the gate, which swings inwards towards the roof. Accordingly, the user may then easily step onto the roof. While in some configurations, the gate may automatically close, in other configuration the user may close the gate after stepping therethrough. Further, as suggested above, the other end of the gate may be held into place by a magnet or other securement mechanism such that the gate is securely positioned to prevent the user from falling off the roof as long as the user is in front of the gate.

In one illustrative embodiment, a gate assembly is provided. The gate assembly includes a mounting bracket having one or more hinges coupled to the mounting bracket. In such a configuration, the gate assembly further includes a gate, a stop, and a support tube. The gate assembly may be coupled to a ladder or a ladder accessory such as extension or elongate members. In such an installation, the ladder accessory may be attached to a ladder. In use, a user may climb the rungs of the ladder, grasp the ladder accessory as the user reaches the top of the ladder, contact the gate such that the gate swings towards the roof, or away from the climbing path, and step onto the desired surface.

In one illustrative embodiment, the gate assembly includes at least one spring assisted hinge to bias or return the gate to a closed position. By biasing the gate closed, the gate assembly may allow a user to climb onto the desired surface and close the opening created by the ladder accessory without requiring further, additional action of the user. This may be particularly helpful in particularly circumstances, such as if the user is carrying something.

The ladders, components, and/or accessories described herein may be formed of a variety of materials and using a variety of manufacturing techniques. Such materials may include, e.g., metals, plastics and other polymers, and/or composite materials. In addition, some portions of the ladder's components may be formed of one material and one or more other components or accessories may be formed of another similar, or entirely distinct material. In some configurations, the rails of the ladders may be formed of composite material such as fiberglass or fiberglass reinforced plastic (FRP) and may be manufactured via a pultrusion process. FRP materials may include various plastic resins, such as polyurethane or polyethylene, or may include various glass materials. It is contemplated that adjusting the FRP formula to use different material combinations may reduce material weight and/or cost. The rails may also be formed of a metal material such as aluminum or aluminum alloys and manufactured via an extrusion process. After extrusion or pultrusion, the ladder rails are typically cut to length. For box-shaped rails, a computerized numerical control (CNC) machine may machine or form one or more holes in the rails. For rails of other shapes, such as C-shaped or I-beam shaped rails, other tools such as a punch press may be leveraged to punch one or more holes into the rails.

The rungs of the ladders may be formed of composite materials such as fiberglass or carbon fiber. In some approaches, the rungs may also be formed of meatal materials such as magnesium, magnesium alloys, aluminum, or aluminum alloys. The rungs may be manufactured, for example, via an extrusion process and cut to length. The rungs may take a variety of shapes and may be, for example, rounded, D-shaped, or triangular.

The rungs of a ladder may be attached to the rails in a variety of different manners. In one approach, the rungs and rails are forged together, such as by having the rungs being attached to the rails via a direct swage connection. In a direct swage connection, a rung is attached directly to the rails using a cold forming process, where a moving die shapes the rung around a hole that was pre-punched in the rail. Annealing operations may be used to soften the metal to prevent cracking. In other approaches, the rungs are attached to the rails via a rung-plate connection in addition to other attachment types. In a rung-plate connection, a rung is attached to a plate and the plate is attached to the rail via one or more rivets or other mechanical elements.

Other accessories and assemblies employed in the ladder, such as feet, locks, ropes, rope pullies, end caps, and/or knee braces may be made of materials such as rubber or plastics like polypropylene or any other suitable plastics. Plastic parts may be injection molded or insert molded. In some approaches, accessories and assemblies such as guide brackets, feet, knee braces, and/or locks, may be formed, extruded or stamped, from metal materials such as aluminum, aluminum alloys, or steel. Rubber feet may be riveted to a base of the ladder. Metal locks may be extruded and then cut to length. Rope pulleys may include extruded metal side portions and plastic round pulleys formed of injection molded plastic, with the side portions and pulley held together by a rivet. End caps may be riveted or snap fit to the ladder during assembly. Similarly, knee caps may be riveted to the ladder.

Referring to the drawings wherein like reference numerals refer to similar or identical parts throughout the several views, and in particular FIG. 1, a gate assembly 100 is shown coupled to a ladder accessory 80, which is coupled to a ladder 50. The ladder 50 includes a first rail 52, a second rail 54, and a plurality of rungs 56. The ladder accessory 80 includes a first elongate member 82 and a second elongate member 84. The first elongate member 82 of the ladder accessory 80 couples to the first rail 52 of the ladder 50. The second elongate member 84 of the ladder accessory 80 couples to the second rail 54 of the ladder 50. As illustrated in FIG. 1, the gate assembly 100 couples to the ladder accessory 80 using a mounting bracket 108 coupled to an end of the first elongate member 82. The gate assembly 100 also may include a stop mounting bracket 122 coupled to the second elongate member 84.

As illustrated, at least portions of the first rail 52 and the second rail 54 are substantially parallel to one another. Similarly, substantial portions of the first elongate member 82 and the second elongate member 84 are substantially parallel to one another. The ladder 50, ladder accessory 80, and the gate assembly 100 may be made of metal, such as, aluminum or steel, however other material may be used, such as a composite material, carbon fiber, and/or plastics, among others. The ladder 50, ladder accessory 80, and gate assembly 100, while assembled together, may be made of different materials and formed using different processes such as die cutting, extrusion, bending, and/or additive manufacturing.

In one exemplary embodiment, the gate assembly 100 is removably coupled to the ladder accessory 80. In the embodiment of FIG. 1, the gate assembly 100 slidably engages the ladder accessory 80. Specifically, the mounting bracket 108 and the stop mounting bracket 122 may slidably engage the ladder accessory 80. Similarly, the ladder accessory 80 also may be removably coupled to the ladder 50 in some configurations. The ladder accessory 80 may slidably engage the ladder accessory 80. Specifically, the first elongate member 82 and the second elongate member 84 may slidably engage the ladder 50.

FIGS. 2 to 5 illustrates the gate assembly 100. As shown, the gate assembly 100 includes the mounting bracket 108, one or more hinges, for example a first or top hinge 106 and a second or bottom hinge 110, a gate 102, one or more support posts 112, and a stop 104. The above listed features may be bolted, screwed, riveted, or otherwise coupled to together to form the gate assembly 100. The top hinge 106 and the bottom hinge 110 may be formed form, bolted, riveted, or screwed onto the mounting bracket 108 on one side and may connect to the gate 102 on the other side. The gate 102 may rotate about the mounting bracket 108 via the top hinge 106 and the bottom hinge 110.

Figure 2:
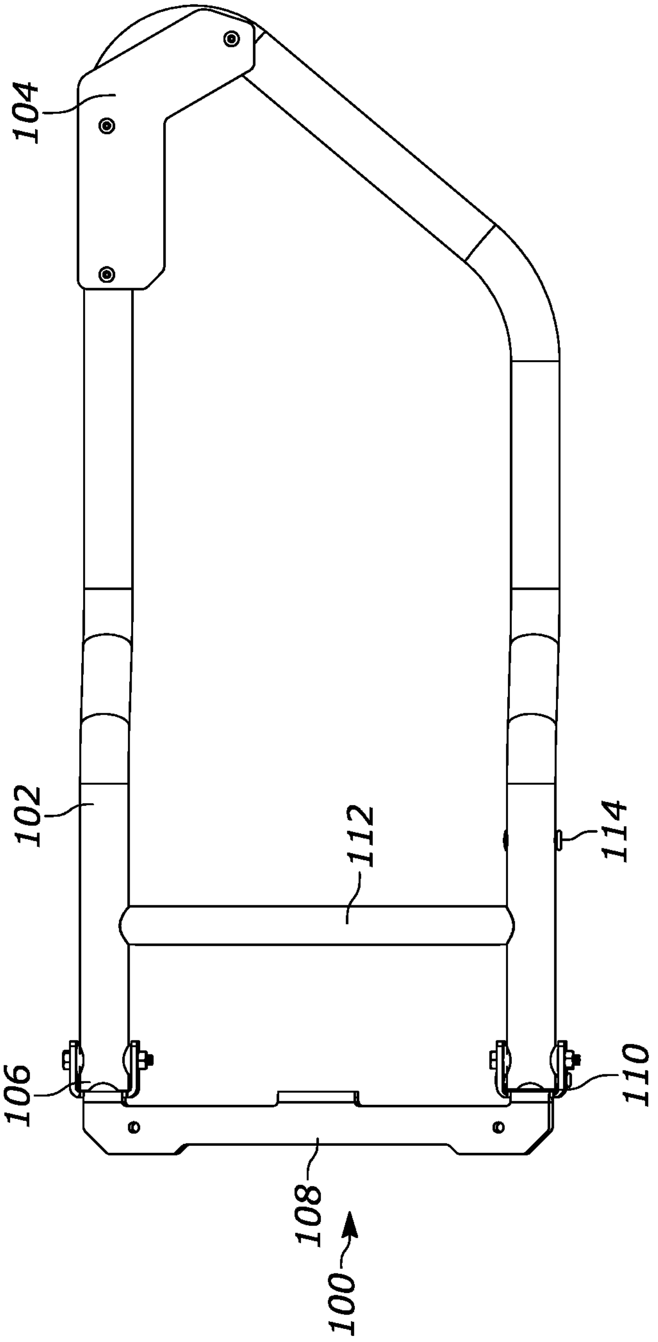
FIG. 2 is a front perspective of the gate assembly of FIG. 1 in accordance with various embodiments.
Figure 3:
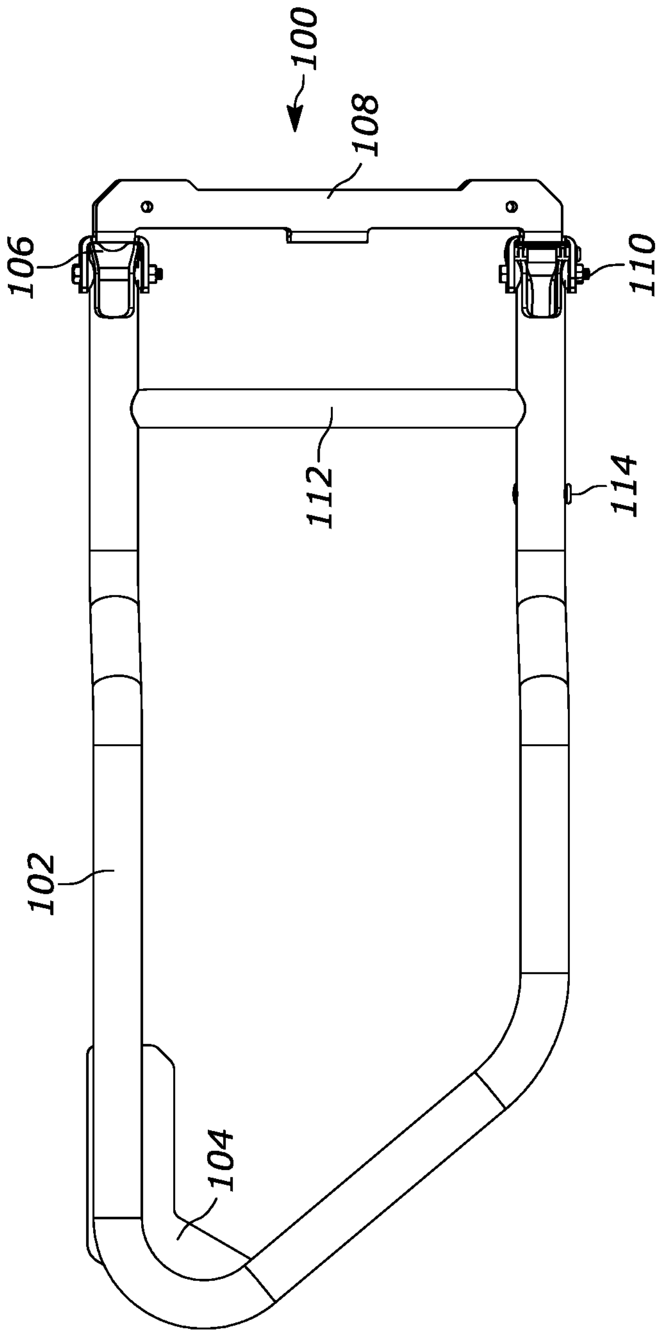
FIG. 3 is a rear perspective of the gate assembly of FIG. 1 in accordance with various embodiments.

The gate assembly 100 may be formed in a variety of manners. For example, the support post 112 may extend from a first or top tube 107 of the gate 102 to a second or bottom tube 111 of the gate 102. While the top and bottom tubes 107, 111 may be formed of a single unitary tube, they also may be discrete pieces that are coupled together. The support post 112 may be formed into or welded to the top tube 107 and the bottom tube 111. The stop 104 may be secured onto the gate 102 using rivets, bolts, or screws. In one illustrative embodiment, the stop 104 includes three points of contact with the gate 102 as shown in FIG. 2. In use, the stop 104 contacts or engages a stop contact 124 coupled to the stop mounting bracket 122, discussed in more detail below. The stop 104 may be formed from stainless steel or another magnetic material or may have a magnetic material embedded therein.

Figure 4:
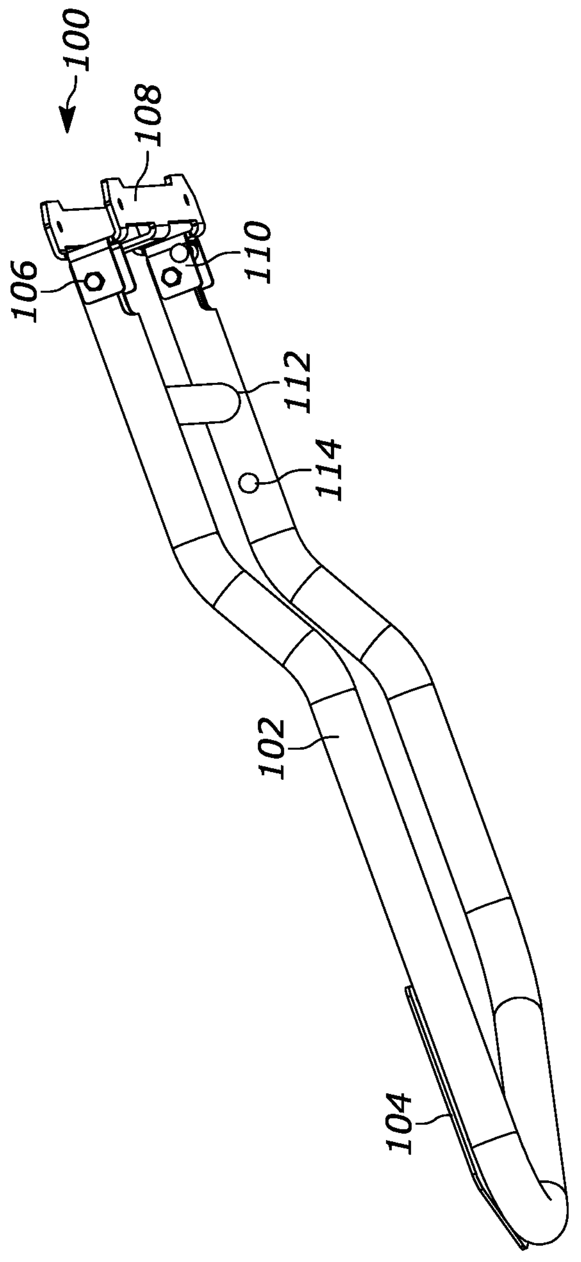
FIG. 4 is a top perspective of the gate assembly of FIG. 1 in accordance with various embodiments.
Figure 5:
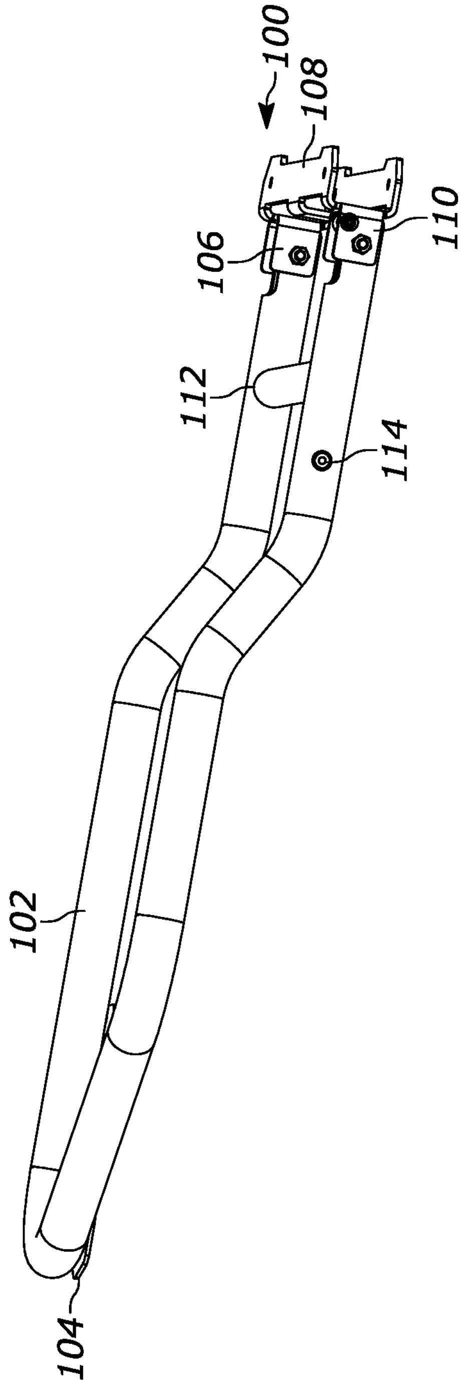
FIG. 5 is a bottom perspective of the gate assembly of FIG. 1 in accordance with various embodiments.

In one illustrative embodiment, the bottom hinge 110 is a spring assisted hinge. The bottom hinge 110 may utilize a hinge rivet 114 to provide the spring-assisted motion, discussed in more detail below with reference to FIGS. 7A to 7C. As shown, the bottom tube 111 includes the hinge rivet 114. The gate 102, and more specifically, the top tube 107 and the bottom tube 111 of the gate 102 includes a bend or curvature along it's width to give the gate more stiffness and allow it to fit flush with the elongate members 82 and 84, as shown in FIGS. 4 and 5. The bend allows the gate 102 to remain at least partially in line with the ladder accessory 80 while allowing for the stop 104 to contact the stop mounting bracket 122 to be closed. Additionally, the bend puts less rotational force on the gate assembly 100 by being more in line with the mounting bracket 108. The bend additionally or alternatively aids in the use of the spring-assisted motion.

In some configurations, the mounting bracket 108 may be made of stamped or formed aluminum. Additionally, the mounting bracket 108 may be bolted onto the first elongate member 82 or the second elongate member 84. The mounting bracket 108 may include the top hinge 106 and the bottom hinge 110 attached to or formed from the non-mounting side of the mounting bracket 108.

The gate body or frame, such as gate 102, may have a substantially elongate shape such as an elongate D-shape. The D-shape, and in particular, the angled portion of the gate 102 below the stop 104 allows a user to open the gate 102 towards a roof and avoid potential clearance issues, such as clearance with a pitch of the roof. The angled portion additionally reduces the weight of the gate 102 which reduces the relative forces involved.

Figure 6:
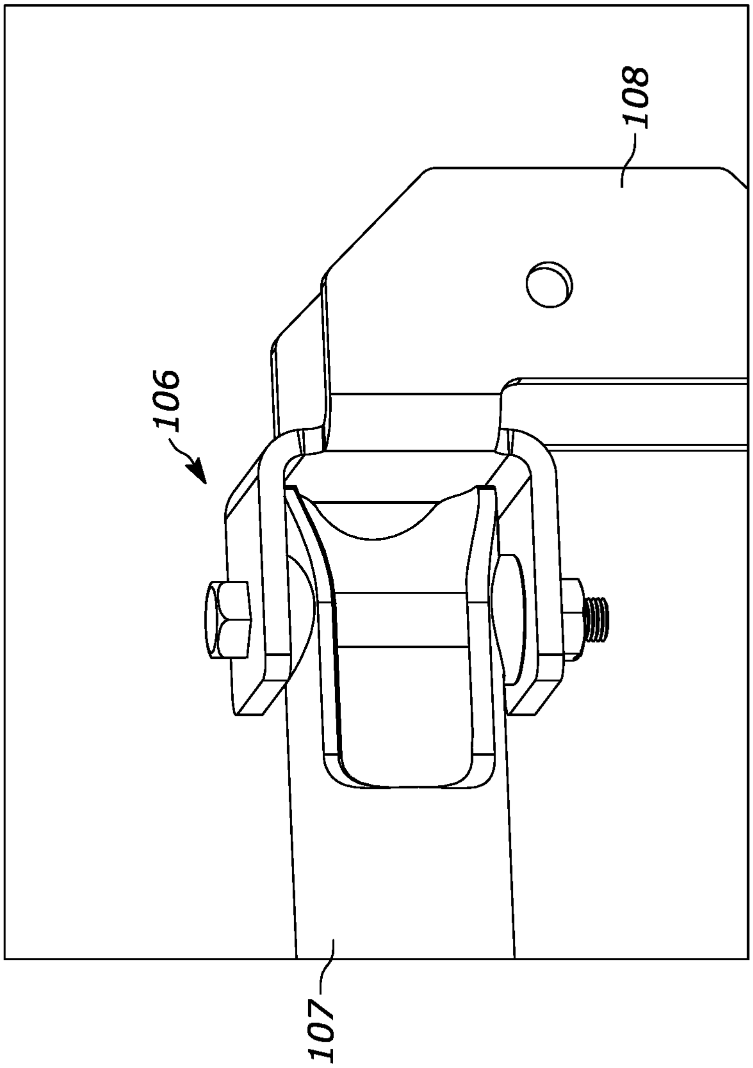
FIG. 6 is a rear perspective of a top hinge of a gate assembly in accordance with various embodiments.

Referring to FIG. 6, the first or top hinge 106 is shown. The top hinge 106 may be bolted onto the mounting bracket 108 using a nut and bolt. In some embodiments, the top hinge 106 is formed of an end portion of the top tube 107 and the mounting bracket 108. The end of the top tube 107 that forms part of the top hinge 106 may be shaped in such a way to aid in avoiding a potential pinch point for a user.

Figure 7A:
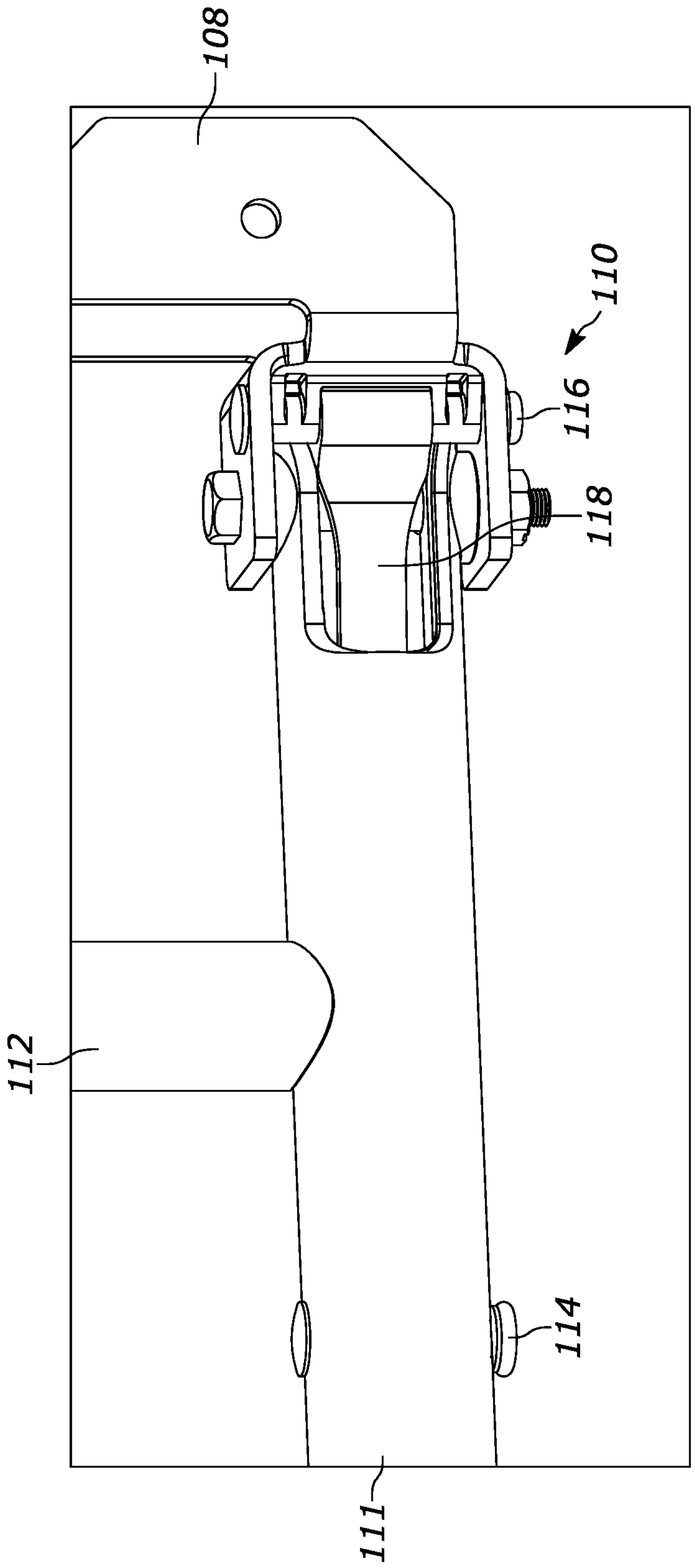
FIG. 7A is a rear perspective of a bottom hinge of a gate assembly in accordance with various embodiments.
Figure 7B:
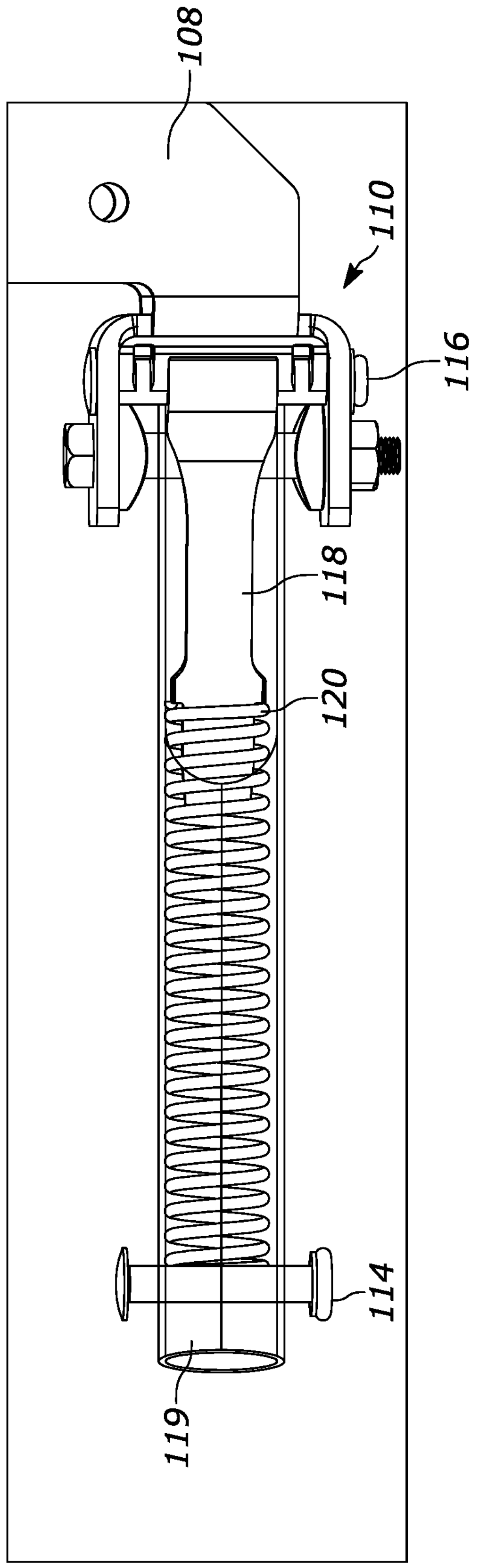
FIG. 7B is a rear perspective of a portion of the bottom hinge of the gate assembly of FIG. 7A in accordance with various embodiments.
Figure 7C:
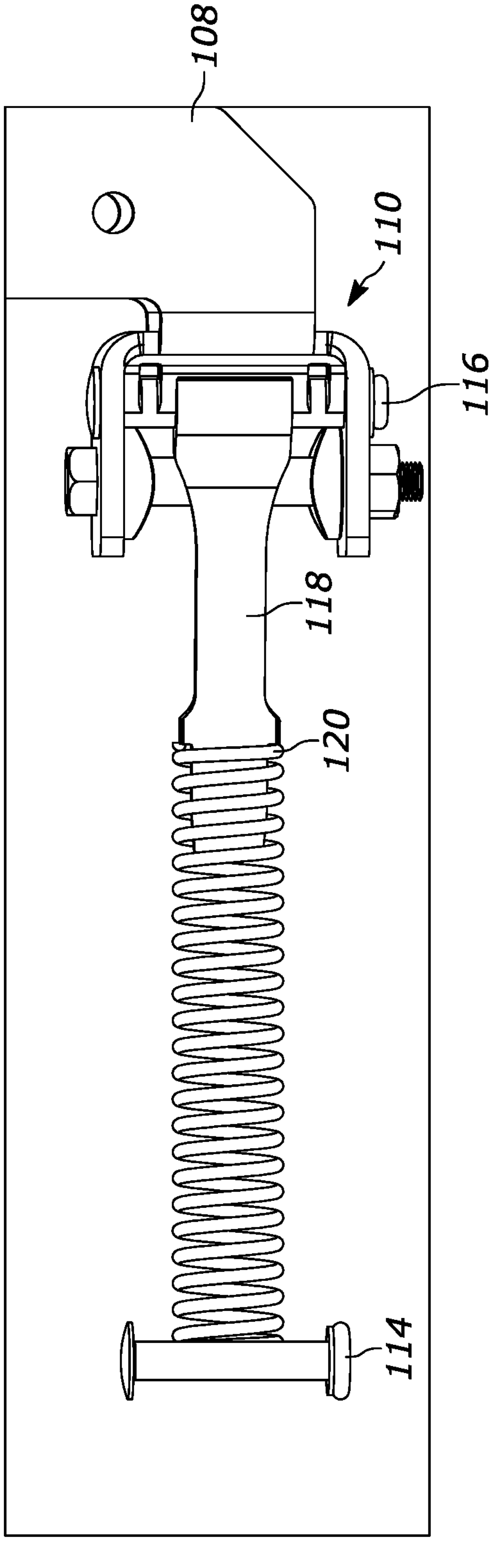
FIG. 7C is a rear perspective of a portion of the bottom hinge of the gate assembly of FIG. 7A in accordance with various embodiments.

Referring to FIGS. 7A to 7C, the second or bottom hinge 110, or the spring-assisted hinge, is shown. While FIG. 7A illustrates the bottom hinge 110 in connection with the bottom tube 111, FIG. 7B illustrates the bottom hinge 110 without the bottom tube 111, thereby more clearly illustrating the support tube 119 described below, whereas FIG. 7C illustrates the bottom hinge 110 without either the bottom tube 111 or the support tube 119. As shown, the bottom hinge 110 is formed with or from the bottom tube 111 and the mounting bracket 108. The spring-assisted motion is provided by, at least in part, the hinge rivet 114, a spring-assisted support tube 119, a spring 120, a plunger 118, and a plunger bolt 116. The plunger bolt 116 is typically offset from the bolt that forms the bottom hinge 110. In some configurations, the plunger bolt 116 is located off-center as compared to the bottom tube 111. In one illustrative embodiment, the plunger bolt 116 is located on the side opposite of the climbing surface, i.e., on the side closest the roof.

The plunger 118 is rotatably connected to the plunger bolt 116. The plunger 118 is shaped to engage the spring 120. The plunger 118, as the gate is being opened, engages the spring 120 and compresses the spring 120. The spring 120 is compressed against the hinge rivet 114. The spring-assisted support tube 119 may be utilized to reinforce the hinge rivet 114 and, additionally or alternatively, guide the spring 120 to compress in the proper direction. While torsion, compression, or extension springs may be leveraged with the gate assembly, the compression spring 120 illustrated in FIG. 7C typically has a longer life, improved power, and reliability as compared to similar gate configurations with a torsion spring arrangement.

In use, a user may climb the ladder 50 and opens the gate 102. By having the plunger bolt 116 disposed on a back side of the gate 102, the plunger 118 (as the gate 102 opens) compresses the spring 120 into the hinge rivet 114. This is in light of the offset arrangement between where the plunger 116 is mounted as compared to the hinge 110. As the user steps through the gate 102 and onto the roof, the gate 102 is an open position. Once the user is on the roof, the frame or gate 102, utilizing the potential energy of the compressed spring 120, is biased or assisted to a closed position.

In one illustrative embodiment, the spring 120 may be compressed approximately 20-60% of the spring's uncompressed length. Similar to the elements described above, the spring-assisted support tube 119 and the plunger 118 may be comprised of metal such as aluminum or steel and may be produced using die cutting.

Figure 8:
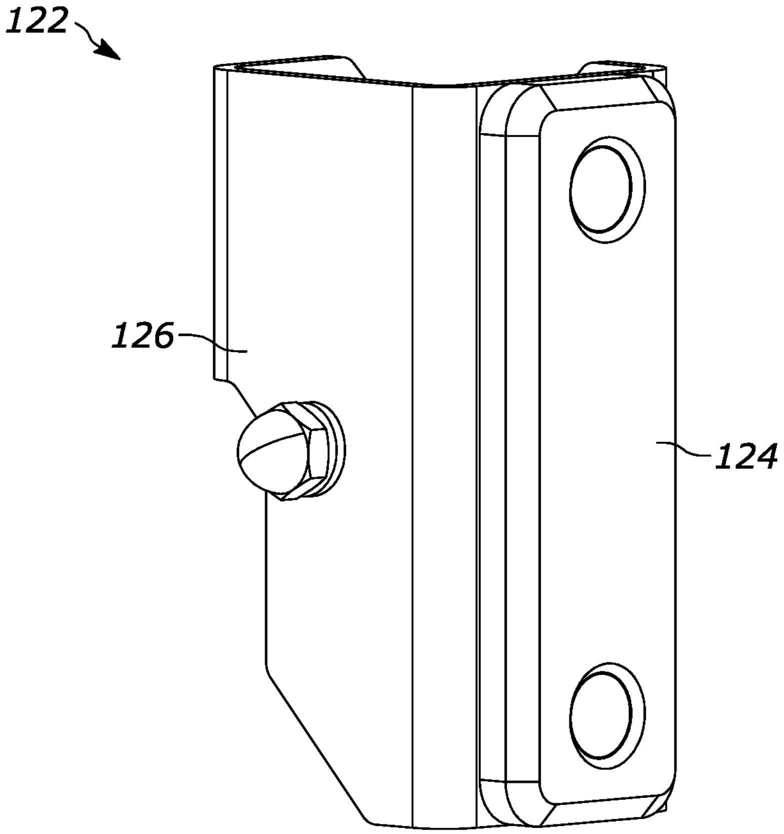
FIG. 8 is a perspective view of a stop bracket in accordance with various embodiments.
Figure 9:
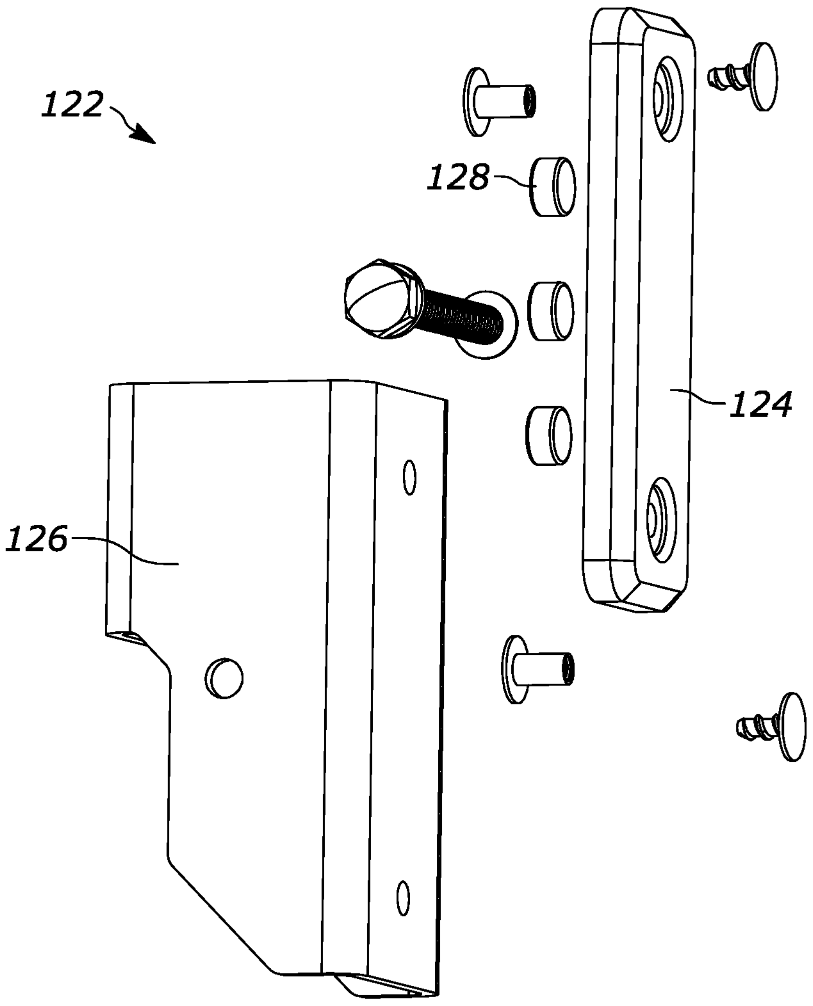
FIG. 9 is an exploded view of the stop bracket of FIG. 8 in accordance with various embodiments.

Referring to FIGS. 8 and 9, the stop mounting bracket 122 is shown. As described above, the stop mounting bracket 122 mounts to the second elongate member 84. The stop mounting bracket 122 may be formed of metal, such as steel or aluminum, and may be formed through bending, stamping, additive manufacturing, and/or die cutting, among other methods. The stop mounting bracket 122 includes a stop contact 124 and a stop bracket 126. The stop mounting bracket 122 typically includes a plurality of magnets 128. The plurality of magnets 128 are disposed between the stop bracket 126 and the stop contact 124 such that the magnets 128 are covered. In one illustrative embodiment the magnets 128 are housed within the stop contact 124.

In one illustrative embodiment, when in a closed position, the stop 104 contacts the stop contact 124 and not the plurality of magnets 128. In one illustrative embodiment three magnets are used. In another embodiment, a single magnet is used. The magnets may be made of rare earth metals, such as, for example, neodymium. The stop contact 124 may be formed of plastic, carbon fiber, or metal. In this manner, the gate 102 may be held or retained in the closed position in light of the magnetic elements of the stop mounting bracket 122 and the compression spring 120.

In one illustrative embodiment, the top hinge 106 includes the spring-assisted motion and corresponding elements described with reference to FIGS. 7A to 7C, this may be in addition to or alternatively to including the spring-assisted motion with the bottom hinge 110.

The gate assembly 100 may be designed in such a way to provide self-closing of the gate 102 from an open position to a closed position. In this way, the relative forces and weights of the elements are considered. Specifically, the size, shape, and weight of the gate 102, the stop 104, and the hinges are considerations. These considerations may include, e.g., the gauge of material used to make the above listed elements, as well as the shape and overall weight.

Similarly, regarding the stop mounting bracket 122, design considerations are given to the structure of the stop mounting bracket 122 and corresponding elements. In particular, the stop contact 124 and the magnets 128 may be adjusted to provide desired magnetic strength of stop mounting bracket 122 to hold the gate 102 in the closed position without requiring undue effort for those attempting to open the gate. These considerations may include the material of the stop contact 124, the size, particularly the thickness, of the stop contact 124, the number of magnets 128, as well as the size and shape of the magnets 128.

As the user climbs up the ladder 50 and uses the ladder accessory 80, the user pushes the gate 102 towards the roof, i.e., away from the climbing surface. The D-shape of the gate 102 allows the gate 102 to clear the roof in some instances where there is a high-pitched roof. The force required to open the gate 102 is larger than the force created by the bottom hinge 110 and the strength of the magnets 128. The open position may be considered any position such that the stop 104 is not in contact with the stop contact 124. The user may then step onto the roof and allow the gate 102 to be biased back towards the closed position.

The relative forces biasing the gate 102 into the closed position may be chosen to provide enough force to bias the gate 102 closed with reasonable strength to close the gate 102 but to avoid potentially knocking the ladder 50 off the roof by slamming the gate 102 into the stop mounting bracket 122 and in turn the second elongate member 84.

Similarly, the relative strength holding the gate 102 in the closed position may be chosen to provide enough force to hold the gate 102 closed against incidental forces such as the lean of the gate 102 on the ladder 50 or other incidental forces such as wind while avoiding too much force a user must apply to open the gate 102. This may be done by adjusting, at least in part, the strength of the spring 120 and the magnetic force produced by the magnets 128.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosed concept.

The invention claimed is:

1. A gate assembly for a ladder having a first elongate member slidably coupled to and extending from a first rail and a second elongate member slidably coupled to and extending from a second rail, the gate assembly comprising:

a mounting bracket attached to and aligned with the first elongate member;

a first hinge bracket attached to a first end of the mounting bracket and a second hinge bracket attached to a second end of the mounting bracket; and a gate frame pivotably attached to the first hinge bracket and the second hinge bracket via one or more mechanical fasteners forming a pivot point;

wherein the gate frame includes:

an upper tube, a lower tube, a side tube between the upper tube and the lower tube, wherein the side tube is disposed opposite the first and second hinge brackets and an outermost portion of the side tube is disposed beyond the second elongate member;

a bend along a width thereof such that a distal portion of the gate frame is offset from a proximal portion that is adjacent the mounting bracket; and at least one spring-assisted hinge element having at least a spring, an anchor rivet, a plunger disposed at least partially within the spring, and a plunger bolt, wherein the at least one spring-assisted hinge element biases the proximal portion of the gate frame to be aligned with the mounting bracket, and wherein the plunger is coupled to the first or second hinge bracket via the plunger bolt that is offset from the pivot point.

2. The gate assembly of claim 1, further comprising a locking bracket attached to the second elongate member with a magnet attached to an inside face of the locking bracket.

3. The gate assembly of claim 1, wherein the gate assembly is coupled to a ladder, the ladder comprising the first rail, the second rail in parallel and spaced relation with the first rail, rungs attached to the first rail and the second rail; the first elongate member slidably attached to a top of the first rail, the second elongate member slidably attached to a top of the second rail, and the gate assembly having the gate frame pivotally attached to the first elongate member, the gate frame extending between the first elongate member and the second elongate member such that the gate frame contacts the second elongate member.

4. The gate assembly of claim 1 wherein the mechanical fastener comprises at least one of: a bolt, a screw, or a rivet.

5. A gate assembly comprising:

a gate frame having a first end and a second end;

one or more hinges coupled to the first end of the gate frame via one or more hinge bolts, wherein at least one of the one or more hinges includes an offset spring assisted hinge;

wherein the offset spring assisted hinge including-includes:

an anchor rivet, a spring, a plunger, a plunger bolt, the one or more hinge bolts, and a support tube, wherein the support tube is disposed within a portion of the gate frame adjacent to the first end, wherein the anchor rivet, the spring, and the plunger are disposed within the support tube, and wherein the spring is coupled to the anchor rivet at a first end and contacts the plunger at a second end;

a stop coupled to the second end of the gate frame and configured to contact a stop mounting bracket; and a mounting bracket attached to the gate frame and the one or more hinges via the one or more hinge bolts, wherein the gate frame is rotatably coupled to the mounting bracket via the one or more hinges forming a pivot point at the one or more hinge bolts upon which the gate frame rotates about, wherein the plunger bolt is offset from the one or more hinge bolts and is configured to bias the spring between the anchor rivet and the plunger.

6. The gate assembly of claim 5, wherein the gate assembly is removably coupled to a ladder accessory, wherein the ladder accessory includes a first elongate member and a second elongate member.

7. The gate assembly of claim 6, wherein the gate frame extends from the first elongate member to the second elongate member.

8. The gate assembly of claim 6, wherein the mounting bracket is removably coupled to the first elongate member and the stop mounting bracket is coupled to the second elongate member.

9. The gate assembly of claim 5, wherein the gate assembly is in an open position when the stop is in a spaced relation from the stop mounting bracket.

10. The gate assembly of claim 5, wherein the gate assembly is in a closed position when the stop is in contact with the stop mounting bracket.

11. The gate assembly of claim 5, wherein the offset spring assisted hinge biases the gate assembly to a closed position.

12. The gate assembly of claim 5, wherein the stop mounting bracket comprises at least one magnet and a stop contact.

13. The gate assembly of claim 12, wherein the stop contact is formed from plastic and houses the at least one magnet.

14. The gate assembly of claim 5, wherein the gate frame, the mounting bracket, and the stop are formed from die cut metal.

15. The gate assembly of claim 5, wherein the spring is compressed approximately 40% when the gate frame is in an open position.

16. A ladder comprising:

a first rail;

a second rail in a spaced relation with the first rail;

a plurality of rungs connecting the first rail and the second rail;

a first elongate member removably and slidably coupled to an end of the first rail;

a second elongate member removably and slidably coupled to an end of the second rail; and a gate assembly including:

a mounting bracket;

at least one hinge attached to the mounting bracket and including an anchor rivet, a spring, a plunger, a plunger bolt, a hinge bolt, and a support tube;

a gate frame including an upper tube, a lower tube, a side tube between the upper tube and the lower tube, wherein the side tube is disposed opposite the first and second hinge brackets and an outermost portion of the side tube is disposed beyond the second elongate member, a bend along a width thereof such that a distal portion of the gate frame is offset from a proximal portion that is adjacent the mounting bracket, wherein the gate frame is pivotably attached to the at least one hinge via the hinge bolt and having a first end and a second end;

a stop; and a stop mounting bracket;

wherein the mounting bracket is removably coupled to the first elongate member and the stop mounting bracket is removably coupled to the second elongate member, wherein the support tube is disposed within a portion of the gate frame adjacent to the first end, wherein the anchor rivet, the spring, and the plunger are disposed within the support tube, and wherein the spring is coupled to the anchor rivet at a first end and contacts the plunger at a second end, wherein the gate frame extends from the first elongate member and extends past the second elongate member, wherein the gate frame is rotatable about a pivot point formed via the hinge bolt such that the proximal portion of the gate frame is adjacent a first surface of the first elongate member and the distal portion of the gate frame is adjacent to and contacts a second surface substantially orthogonal to the first surface such that the second surface of the second elongate member acts as a stop to prevent the gate frame from rotating outwards, wherein the plunger bolt is offset from the hinge bolt and is configured to bias the spring between the anchor rivet and the plunger as the gate assembly is rotated to an open position.

17. The ladder of claim 16, wherein the at least one hinge includes a spring assisted hinge to return the gate assembly from the open position to a closed position.

18. The ladder of claim 16, wherein the gate assembly includes a stop contact coupled to the distal portion of the gate frame.

19. The ladder of claim 18, wherein the stop mounting bracket comprises at least one magnet.

* * * * *